May 26, 1959 R. K. RICHARDS 2,888,556

ELECTRONIC COUNTING SYSTEM

Filed Dec. 21, 1953 4 Sheets-Sheet 1

INVENTOR.

BY Richard K. Richards

Davis, Hoxie & Faithfull

ATTORNEYS

INVENTOR.
Richard K. Richards
BY
Davis Hoxie & Faithfull
ATTORNEYS

INVENTOR.
Richard K. Richards
BY
Davis Hoxie & Faithfull
ATTORNEYS

May 26, 1959 R. K. RICHARDS 2,888,556

ELECTRONIC COUNTING SYSTEM

Filed Dec. 21, 1953 4 Sheets-Sheet 4

INVENTOR.
Richard K. Richards
BY
Davis, Hoxie & Faithfull
ATTORNEYS

United States Patent Office 2,888,556
Patented May 26, 1959

2,888,556

ELECTRONIC COUNTING SYSTEM

Richard K. Richards, Poughkeepsie, N.Y., assignor to International Business Machines Corporation, New York, N.Y., a corporation of New York Application December 21, 1953, Serial No. 399,523

20 Claims. (Cl. 250—27)

This invention relates to counting systems and more particularly to systems of the so-called ring or electronic commutator type, such as are extensively used in high speed computers.

As constructed heretofore, such counting systems have consisted of a plurality of similar stages connected in a series. Each of the stages has two states or conditions of stability, which are arbitrarily designated "On" and "Off," one (or possibly more) of the stages of a system being in the "On" state and the remaining stages in the "Off" state. Counting is accomplished by simultaneously applying input pulses to all the stages, each of the input pulses having the effect of transferring any stage which is in the "On" state to the "Off" state. Each stage is interconnected with the following stage so that as any stage is transferred from the "On" to "Off" state a special auxiliary pulse is impressed upon the succeeding stage to transfer the succeeding stage from the "Off" to "On" state so that as input pulses are sequentially applied to the system each stage is successively transferred to the "On" state, the stage which is "On" at any time being a measure of the total number of input pulses applied to the system prior to such time. While counting systems similar to those mentioned above operate successfully at lower counting rates, they have been found to be less satisfactory at higher rates because the succeeding stage which is transferred from "Off" to "On" receives not only the special auxiliary pulse from the preceding stage but also an input pulse which tends to maintain the stage in the "Off" state. At higher operating frequencies the intervals between these pulses is so reduced that they tend to reach the stage substantially at the same time so that the operation is not dependable.

It is accordingly the objects of this invention to provide a counting system which is dependable in operation, which is operable at high counting rates, which does not have two pulses applied simultaneously to any stage, which requires a minimum of conventional circuit elements, which uses standard electron tubes and which advances the art generally.

A counting system according to the present invention comprises a series of similiar stages each of which has two alternate states or conditions of stability which may be obtained by any of a number of circuits, such as by the well known "flip-flop" or trigger circuits of the multi-vibrator type having a pair of electron tubes which are alternatively conductive to provide the two states of stability. Each stage also includes a switching circuit or gate which is interposed between the stage and the source of input signals. The switching element is also interconnected with the trigger circuit of the stage so that it passes an input pulse only when the stage is in a first or, as arbitrarily designated, "On" state, the input pulses being blocked by the switching circuit when the associated trigger circuit is in the alternative or "Off" state. As the system is usually set up, only one stage is arranged to be in the "On" state and the remaining stages are in the "Off" state. Each stage is also interconnected with the succeeding stage so that as any stage is transferred from "On" to "Off" a special auxiliary pulse is applied to the succeeding stage which conversely transfers the succeeding stage from "Off" to "On," the auxiliary pulse preferably being negative and applied to the control electrode of the trigger circuit tube which is conducting when the stage is in the "Off" state. Such an auxiliary pulse may be derived, among other ways, from the anode of the corresponding tube in the preceding stage, which when the stage transfers from "On" to "Off," becomes relatively more negative; or alternatively, the auxiliary pulse may be derived from the output of the switching circuit of the preceding stage, which has the advantage of no interconnection between the the trigger circuits.

These and other objects and aspects of the invention will be apparent from the following description of several specific embodiments of the invention which refer to drawings wherein.

Figure 1:
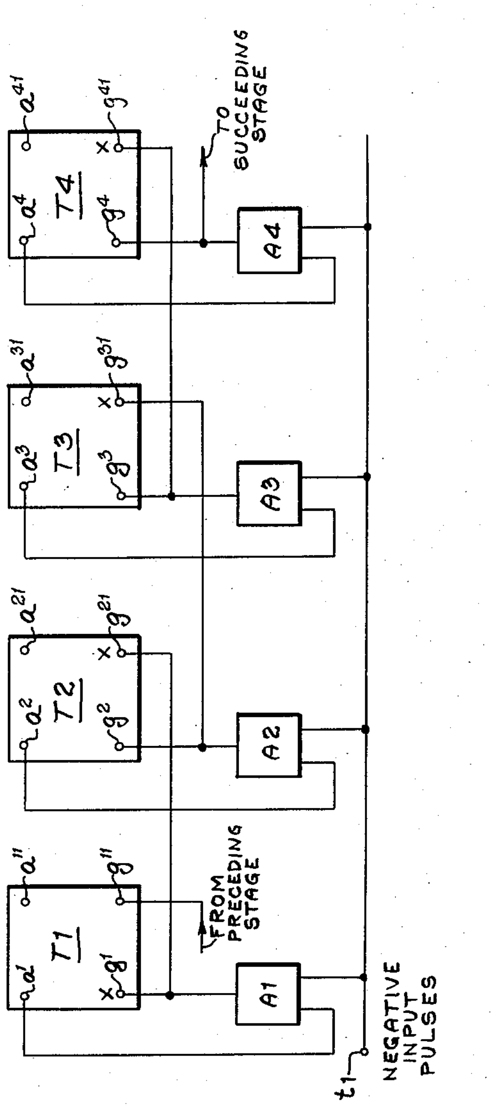
Fig. 1 is a block diagram showing several stages of one embodiment of the invention.

In Fig. 1 are shown four stages of a counting system wherein the blocks designated T1, T2, T3 and T4 represent conventional "flip-flop" or trigger circuits each of which has a pair of triode vacuum tubes interconnected, as will be described in detail below, so that the tubes are alternatively conductive, the conductivity of each tube corresponding respectively to one of the states of stability of the circuit. Each stage is also provided with a switching circuit A which is interposed between a source of negative input signals *t1* and the control electrode *g1* of the left hand tube of the corresponding stage. The characteristics of the switching circuit A, which will be described in detail hereinafter, are such that it will have an output only when negative signals are applied to both its input channels so that the circuit is termed a negative And switch, i.e., a negative signal must be impressed upon the first and second input channels to operate the switch.

Interconnection between the first stage T1 and the succeeding stage T2 is obtained by linking the output channel of the And switch A with the control electrode *g21* of of the right hand tube of the stage T2 so that when the the And switch is "opened" by the impressing of a negative potential upon one of its input channels, the application of a negative input pulse upon its other input channel will cause a negative output potential at its output channel. The negative output potential is applied to both the control electrode *g1* of the left hand tube of the first stage and the control electrode *g21* of the right hand tube of the second stage T2. The following stages, of which only T2, T3 and T4 are shown, are each provided respectively with a negative And switch A similar to the switch described above, and are each interconnected with the succeeding stage in an analogous manner. Although not necessary for the operation, an endless system may be formed by connecting the And switch of the last stage to the control electrode of the right hand tube of the first stage to complete a ring commutator.

In the diagram in Fig. 1 an X is placed above the control electrode terminal of each trigger circuit to indicate which of its tubes is conducting. As the system is usually set up, the left hand tube of only one of the stages is conducting, this condition of its trigger circuit being arbitrarily designated as the "On" state of stability of the stage, and the right hand tubes of the trigger circuits of the remaining stages are conducting, which is designated the "Off" state of stability. In the "On" state the left hand tube by definition is conducting so that the voltage drop in the associated anode circuit causes its anode to be at a relatively more negative potential than that of a tube which is biased beyond cut-off and not conducting. This relatively negative anode potential is impressed upon one of the input channels of the corresponding And switch A which is thus conditioned or "opened" to pass the next negative input pulse which occurs. Conversely, in the stages which are "Off" the left hand tube is not conducting, and a relatively positive potential is impressed upon the And switch so that the input pulse is blocked by the switch. In other words, the input pulse is controlled by the And switches so that it is only impressed upon the control electrode of the conducting left hand tube of the particular stage which is in the "On" state, and is blocked so that it does not reach the control electrodes of non-conducting left hand tubes in the stages which are "Off." When, as described above, a negative pulse is passed by the And switch A and is impressed upon the control electrode *g1* of the left hand conducting tube of the stage T1, the current flow through the tube is reduced, and by a progressive interaction between both tubes, described in detail below, the left hand tube is biased to cut-off and the right hand tube conducts, i.e., the trigger circuit "flips" or transfers from the "On" to the "Off" state of stability. The resulting rise in the anode potential of the left hand tube causes the And switch to be non-conducting. The negative pulse passed by the And switch A is also impressed upon the control electrode *g21* of the right hand tube of the succeeding stage T2, which is the conducting tube of the stage, so that this stage is transferred from the "Off" to the "On" state of stability in a reverse but analogous manner to the transfer action of the first stage. The stages other than T1 and T2 are not effected by the input pulse because the pulse is blocked by their respective And switches which have a relatively positive potential from the anodes of the left hand tubes impressed thereupon.

After the above transfers of stages T1 and T2 have been completed, the succeeding negative input pulse is blocked by the And switches of the first, third and fourth stages, which are in the "Off" state, and passed by the And switch of the second stage T2 which is "On" so that the states of stability of the trigger circuits of the second and third stages are transferred by the succeeding pulse in a manner similar to that described above. Correspondingly, the third input pulse transfers the states of the third and fourth stages and succeeding pulses each transfer a corresponding stage and its succeeding stage so that the particular stage in the "On" state at any time is a measure of the number of pulses counted to such time.

Figure 2:
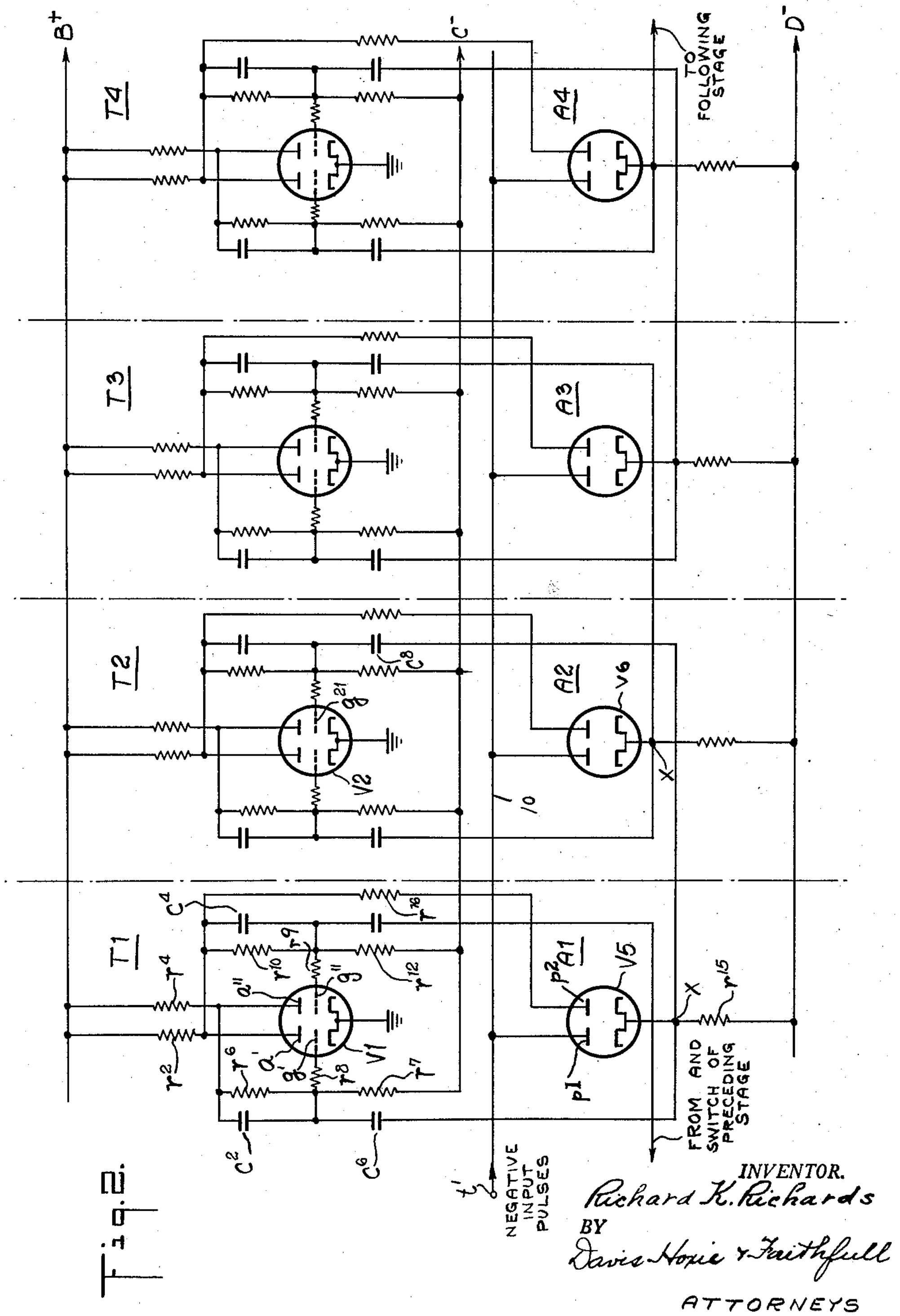
Fig. 2 is a wiring diagram of the embodiment shown in Fig. 1.

In Fig. 2 is shown the wiring diagram of one of the several circuits which can be used to perform the functions described above. The trigger circuit of the stage T1 comprises two triode vacuum tubes V1 which are shown enclosed in a single envelope such as that of a type 6J6, although it is to be understood that two separate triodes may be used. The cathodes of the triodes are directly linked to ground or zero potential reference level, and their anodes *a1* and *a11* are connected by means of anode circuit load resistors *r2* and *r4*, respectively, with the positive terminal B+ of a conventional high voltage power supply (not shown). One end of a voltage dividing network which includes the resistors *r6* and *r7* is connected to the anode *a11* of the tube V1, the other end of the network with a negative potential terminal C— of the power supply. The common junction of the resistors *r6* and *r7* is connected by a coupling resistor *r8* with the control electrode *g1*. In an analogous manner a second voltage dividing network including the resistors *r10* and *r12* is connected between the other tube anode *a1* and the negative terminal C— with its intermediate common junction linked with the control electrode *g11* by a resistor *r9*. The resistors *r6* and *r10* are shunted by capacitors C2 and C4, respectively.

If, for the purpose of explanation, the left hand triode of the stage T1 is assumed to be conducting, the flow of current through its anode load resistor *r2* results in a voltage drop so that the anode *a1* is at a relatively more negative (or less positive) potential than when the tube is not conducting. As the potential level at the bottom of the resistor *r12* is fixed by the terminal C—, the more negative the anode *a1* and the top of the resistor *r10* become, the more negative the potential becomes which is impressed upon the control electrode *g11*. The values of the resistors *r10* and *r12* are selected so that with the left hand tube conducting, the potential upon the control electrode *g11* biases the right hand triode beyond cut-off. With the right hand triode not conducting, the voltage drop across its load resistor *r4* is at a minimum and a relatively positive potential is impressed upon the anode *a11* and the control electrode *g1* by the resistors *r6* and *r8*, and this relatively positive potential maintains the conducting condition of the right hand triode so that the trigger circuit is maintained in the first or "On" state of stability.

The trigger circuit is "flipped" or transferred from the "On" to its alternate or "Off" state of stability wherein the right hand triode is conducting by the application of a negative potential pulse to the control electrode *g1* of the left hand conducting triode. The negative pulse on the control electrode *g1* results in a reduction in the current flow through the left hand triode and its load resistor *r2* so that the voltage drop across the resistor is also reduced. The smaller voltage drop causes the anode potential and the potential upon the control electrode *g11*, which is determined thereby, to become more positive so that the right hand triode starts to conduct. The resulting current flowing through its anode resistor *r4* results in the control electrode *g1* becoming still more negative and reducing the current flow through the right hand triode which, in turn, makes the control electrode *g11* really more positive, such interaction between the triodes progressively continuing until the potential upon the control electrode *g1* is negative enough to cut the left hand triode off and the control electrode *g11* is at the maximum positive value so that there is a maximum current flow through the right hand triode, i.e., the trigger circuit is in its "Off" state of stability. Conversely, the trigger circuit can be transferred from its "Off" state of stability with the right hand triode conducting to its "On" state with the left hand triode conducting by the application of a negative pulse to the control electrode *g11*, whereupon a similar but opposite transfer action to that described above takes place until the right hand triode is cut off and the left hand triode is conducting. The trigger circuits of the other stages are similar in construction and operation.

If, as assumed above, the first stage T1 is in the "On" state, i.e., the left hand triode is conducting, the remaining stages are in the "Off" state, i.e., the right hand triodes are conducting. Therefore, if a first input pulse is to transfer the first stage T1 to the "Off" state, a negative potential pulse must be applied to the control electrode *g1* of the tube V1, and a negative pulse must be also applied to the control electrode *g21* of the tube V2 in the second stage T2 to transfer the second stage to the "On" state. No change need be made in the state of the other stages which are in the "Off" state.

The negative input pulses are applied to the control electrodes of the conducting tubes of the first and second stages by a switching circuit, such as the negative And switch A1, which passes a negative signal only when relatively negative potentials are applied to both its input channels. The And switch A1 shown in Fig. 2 comprises a resistor *r*15 one end of which is connected to the negative terminal D— of the power supply. The other end of the resistor, whose terminal is designated X and forms the output channel of the switch, is connected with two unidirectional current carrying elements which may be either a double diode V5 or other rectifying element having unidirectional electrical current carrying properties. The resistor terminal X is directly linked with the cathodes of the diode V5 so that when a potential more positive than the power supply terminal D— is applied to either of the anodes *p*1 or *p*2 a current flows through the corresponding diode and the resistor *r*15, the voltage drop through the resistor causing the terminal X to be relatively positive with respect to the terminal D—.

If it is assumed that the internal resistance of the twin diodes V5 is the same then the anode *p*1 or *p*2 whichever is at the more positive potential relatively to the terminal D— is controlling and carries the current which flows through the resistor *r*15, the other diode because of its rectifying action having no flow therethrough as long as its anode is negative with respect to the potential of the terminal X resulting from the IR drop due to the current flow through the resistor. This action is made use of by connecting the anode *p*2, forming one of the input channels, with the anode *a*1 of the left hand triode by a coupling resistor *r*16, and connecting the other input channel anode *p*1 with the input signal terminal *t*1 by means of a conductor 10. The resistors *r*2, *r*16 and *r*15 which form a voltage divider between the power supply terminals B+ and D—, are of such values that when the left hand triode is not conducting (i.e., the stage in the "Off" state), and the voltage drop through its anode resistor *r*2 is a minimum, the potential at terminal X is at a greater positive value with respect to the terminal D— than the relatively most positive potential impressed upon the diode anode *p*1 by an input signal pulse; and, conversely, when the left hand triode is conducting (i.e., the stage in the "On" state) the resultant current flow through its anode resistor *r*2 causes a voltage drop which, if it were not for the hereinafter described conducting action of the left hand diode, would make the terminal more negative than the relatively most negative potential impressed upon the anode *p*1 by an input signal pulse. To minimize the drop in potential of terminal X as the triode anode *a*1 conducts, the steady state voltage impressed upon the anode *p*1 in the absence of an input signal is held at such a value that the terminal X becomes sufficiently negative to cause the left hand diode to conduct after a small drop in the terminal potential whereupon the left hand diode takes over control and prevents a further negative drop in the terminal potential.

As mentioned above, the input signal consists of a series of negative pulses which are to be counted, a negative pulse as the term is used herein being a pulse whose peak value is relatively negative as compared to the more positive steady state voltage at the input terminal *t*1. With the left hand triode of the associated trigger circuit not conducting, the potential upon the diode anode *p*2 is more positive than the steady state potential impressed upon anode *p*1 by the terminal *t*1 so that the current flow through the resistor *r*15 is controlled by the right hand diode, and an input pulse upon the anode *p*1 which makes the anode more negative with respect to the terminal X than with the normal steady state potential upon the anode will not effect this current flow nor the potential of terminal X, i.e., with a stage "Off," the associated And switch is "closed" to the passage of negative input signals.

With the left hand triode conducting, the potential upon the diode anode *p*2 is more negative than the negative peak potential of the input signals upon the anode *p*1 so that the current flow through the resistor *r*15 is controlled by the left hand diode. An input signal upon the anode *p*1 makes the anode relatively more negative with respect to the terminal D— so that the current flow through the resistor *r*15 is reduced to make the terminal X more negative. At the end of a pulse the voltage at the anode *p*1 returns to its normal steady state condition which is relatively more positive so that the current flow through the resistor *r*15 is greater with a resulting larger IR drop to make the terminal X more positive, i.e., the potential at terminal X is then a function of the potential on the anode *p*1 so that the switch can be considered to be "open" to negative pulses when the associated stage is in the "On" state.

The terminal X is connected with the control electrode *g*1 of the left hand triode V1 of the first stage T1 and the control electrode *g*21 of the right hand triode V2 of the second stage T2 by means of small coupling capacitors *c*6 and *c*8, respectively, so that when the stage T1 is in the "On" state, the negative voltage pulse at the terminal X resulting from a negative input pulse on the anode *p*1 is impressed upon both control electrodes. As described above, the applying of a negative voltage to the control electrode *g*1 of the conducting left hand triode of the first stage T1 transfers the stage from the "On" to the "Off" state; and the applying of a negative voltage to the control electrode *g*11 of the conducting right hand triode of the second stage T2 transfers the stage from "Off" to "On."

The stages T2, T3, T4 and the following stages (not shown) each are provided respectively with a negative And switch similar to the switch A1 described in detail above. As these stages are all in the "Off" state when the stage T1 is in the "On" state, the anodes *p*2 of the diodes of the And switches of the "Off" stages all have a relatively positive potential impressed thereupon which is derived from the anodes of the non-conducting left hand triodes of their respective stages. With a positive potential on the anodes *p*2 the above mentioned input pulse, which is passed by the And switch A1 of the first stage T1, is blocked by the And switches of these following stages, and with the exception of the second stage T1 no negative voltage is applied to the control electrodes of their trigger circuits so that they remain in the "Off" state of stability. With the stage T2 in the "On" state as a result of the above mentioned first input pulse, a second input pulse will be passed by And switch A2 to transfer the second stage T2 from "On" to "Off" and the third stage T3 from "Off" to "On." Similarly each succeeding input pulse will only have the effect of transferring the stage which is "On" and its following "Off" stage so that after a series of input pulses the particular stage which is then in the "On" state is a measure of the number of pulses in the series.

Figure 3:
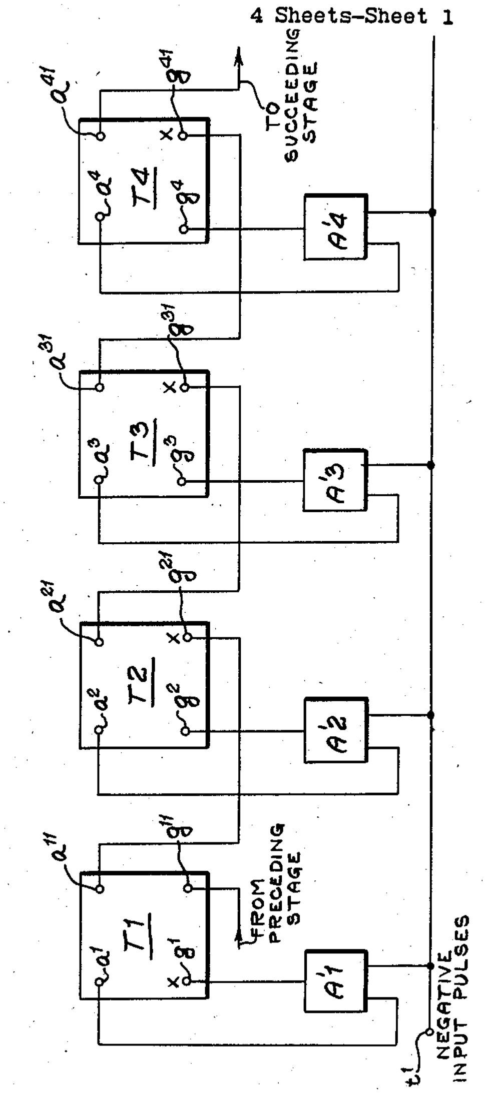
Fig. 3 is a block diagram showing several stages of a second embodiment.
Figure 4:
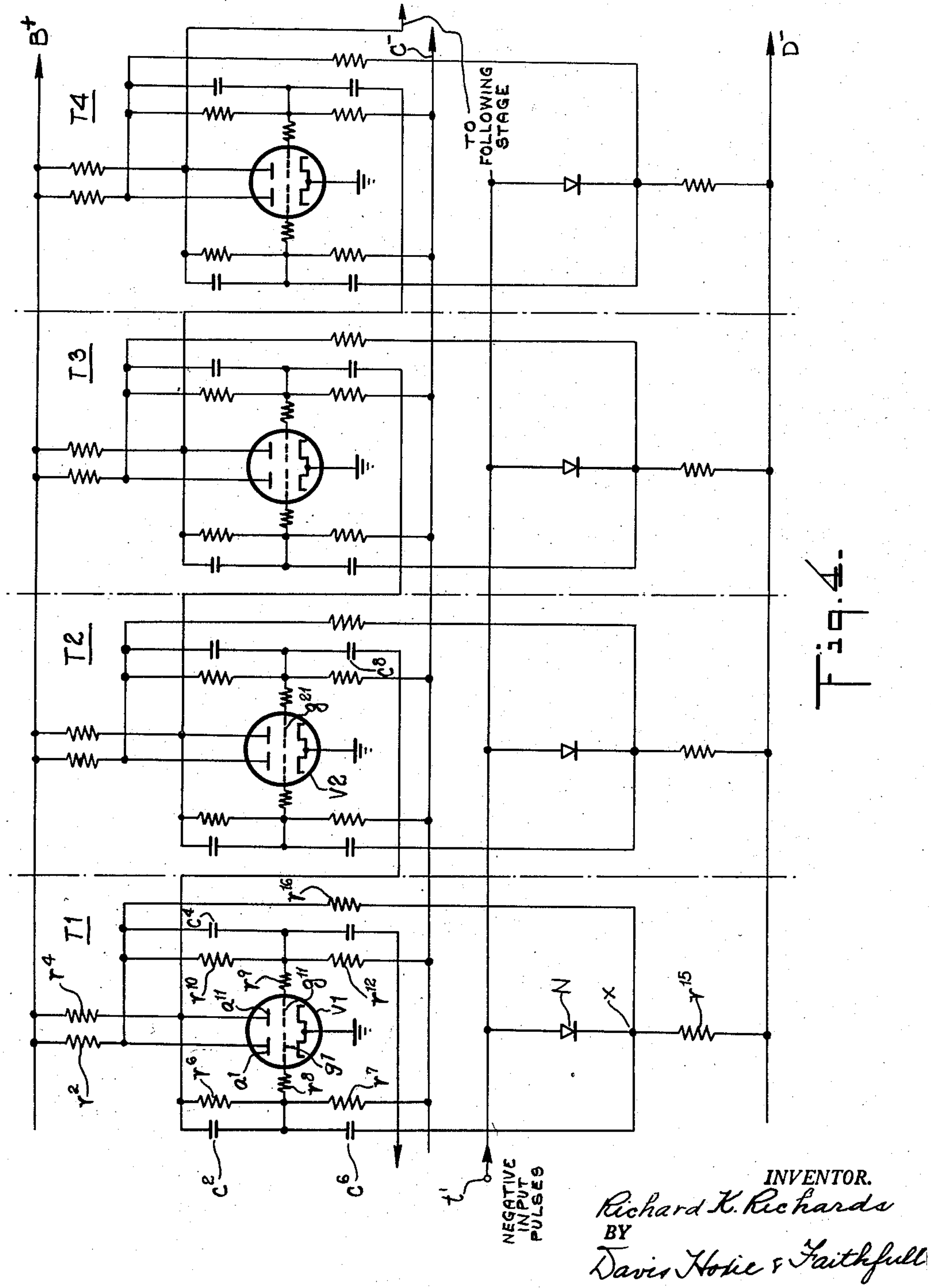
Fig. 4 is a wiring diagram of the second embodiment shown in Fig. 3.

In Fig. 3 is shown the block diagram of a second embodiment of the invention wherein the anode of the right hand triode of each stage is connected with the control electrode of the right hand triode of the following stage so that as the preceding stages transfer from "On" to "Off" the relatively negative potential developed on the anode of the right hand triode is impressed upon the control electrode of the succeeding stage to transfer the stage from "Off" to "On." In Fig. 4 is a wiring diagram of the system shown in Fig. 3 wherein the trigger circuits are similar in construction and operation to those of the first embodiment described heretofore with the exception of the above mentioned connection of the control electrode *g*21 to the anode *a*11.

The And switch A'1 in the second embodiment is of an alternate construction, the double diode V5 of the first embodiment being replaced by a single rectifying element N which is connected between the terminal X of the resistor *r*15 and the input signal terminal *t*1. With the first stage T1 in the "Off" state, the left hand triode is not conducting so that its anode *a*1 is relatively positive and the voltage divider consisting of the resistors *r*2, *r*16 and *r*15 impresses a potential upon the terminal X which is more positive than the steady state potential upon the terminal $t1$. With the terminal X at a more positive potential than the terminal $t1$ the rectifying element N will not conduct so that the input signal pulses are blocked in a manner analogous to the operation of the left hand diode of the And switch A1 described in detail above. With the first stage T1 in the "On" state, the left hand triode is conducting so that the voltage drop across its load resistor $r2$ causes its anode $a1$ to become relatively negative, but this has no appreciable effect upon the potential of the terminal X because of the clamping action of the rectifying element N which in the absence of an input pulse provides a low resistance path between terminals X and $t1$ and the resulting current flow from terminal $t1$ through the rectifying element N and the resistor $r15$ causes a voltage drop across the resistor which is controlling and maintains the terminal X at a relatively positive potential determined by the steady state voltage of the terminal $t1$. When upon the occurrence of an input pulse the potential of the terminal $t1$ becomes relatively more negative with respect to the terminal D—, the current flow through the resistor $r15$ is reduced correspondingly and the terminal X becomes relatively more negative due to a corresponding reduction of the voltage drop across the resistor. This relative negative voltage at terminal X is applied to the control electrode $g1$ of the left hand triode V1 by the coupling capacitor $c6$ so that the stage T1 is transferred from the "On" to the "Off" state by an action similar to that which has been described in detail above.

As the stage is transferred to the "Off" state by the action of an input pulse as described above, the left hand triode is not conducting so that the voltage drop across the load resistor $r2$ is reduced and its anode $a1$ and the terminal X are at a more positive potential than the terminal $t1$. Because of the unidirectional current properties of the rectifying element N, an And switch will then block the input pulse, but this is immaterial as the blocking action can take place only after the input pulse has been effective to transfer the stage from the "On" to the "Off" state.

As a stage is transferred from "On" to "Off," the right hand triode conducts so that its anode potential becomes more negative as described above. The negative anode potential is transferred by the coupling capacitor $c8$ to the control electrode $g11$ of the right hand triode of the following stage, resulting in a transfer of the second stage from "Off" to "On."

Figure 5:
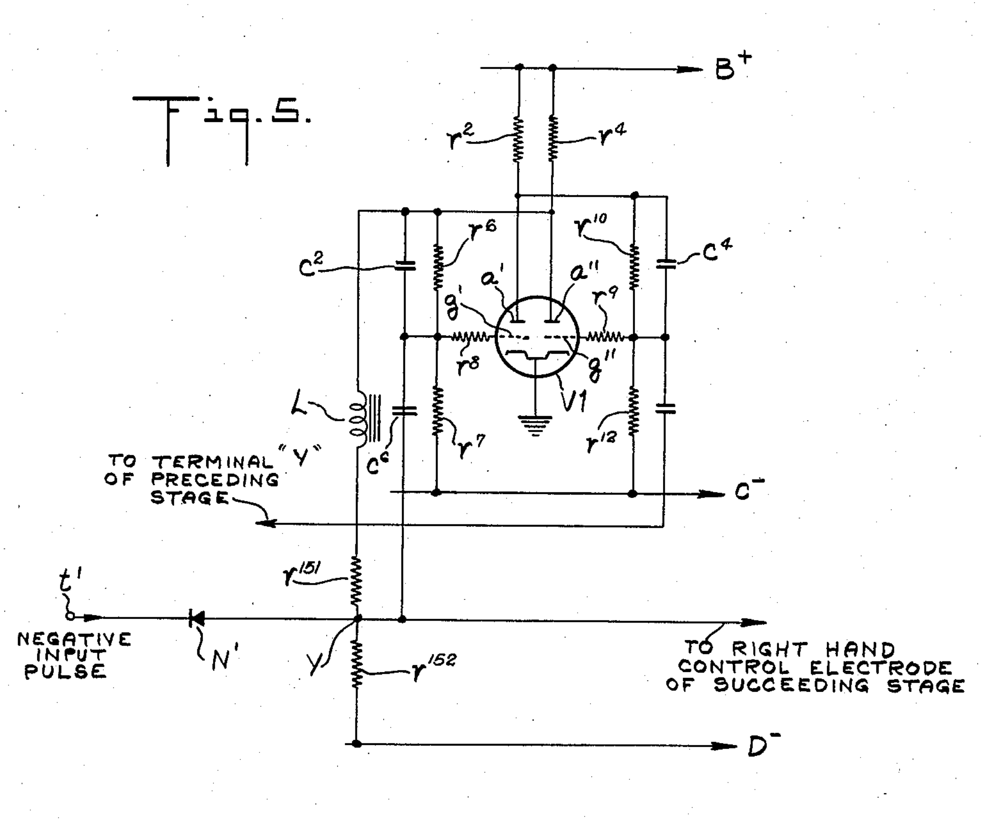
Fig. 5 is a wiring diagram of a modification of the first embodiment shown in Fig. 2 showing an alternative switching circuit.

Fig. 5 is the wiring diagram of a single stage incorporating a third type of switching circuit which differs from the negative And switches described heretofore in that it requires a positive rather than a negative potential impressed upon its second input channel to cause the circuit to pass a negative pulse. The trigger circuit in this stage is again similar to those described above. The third type of switching circuit comprises a voltage divider having two resistors $r151$ and $r152$ connected in series by means of a common terminal Y which forms the output channel. One end of the resistor $r152$ is connected to the negative power source terminal D— and one end of the resistor $r151$ is connected through a choke L with the anode $a11$ of the right hand triode V1 so that a current flows in the conventional sense from the terminal B+ through the load resistor $r4$, the choke L and the resistors $r151$ and $r152$ to the terminal D—. The common resistor termial Y is connected with the negative input pulse terminal $t1$ by a rectifying element N' which is oriented so as only to pass a current (in a conventional sense) only if the terminal Y is at a relatively more positive potential than the terminal $t1$. The terminal Y is coupled with the control electrode $g1$ of the left hand triode of the illustrated stage by a capacitor $c6$ so that whenever a negative pulse appears at Y, the stage is transferred from the "On" to "Off" state as described heretofore.

The terminal Y is also connected with the control electrode of the right hand triode of the succeeding stage so that this stage is simultaneously transferred from "Off" to "On" by a negative potential at terminal Y.

When the stage illustrated is in the "Off" state, by definition, the right hand triode is conducting and its anode potential is at a negative potential as is the potential at the terminal Y which by the selection of circuit elements is at a relatively more negative value than the negative peaks of the input signal pulses at the terminal $t1$. The capacitor $c6$ prevents the flow of other than a transient current between the terminal Y and the junction of the resistors $r6$ and $r7$ so that the magnitude of potential upon the control electrode $g1$ is controlled by the current flow through the resistors to the terminal C— and not by a steady state negative potential at terminal Y, any sudden changes in the negative steady state potential as the trigger circuit transfers from one state to the other being smoothed out by the choke L. Because of the unidirectional properties of the rectifying element N' no current can flow when the input terminal $t1$ is relatively more positive than the terminal Y. With no current flowing through the rectifying element N' the occurrence of a relatively more negative input signal has no effect on the potential at Y, i.e., the signal pulse is blocked by the switching element so that the control electrodes of the associated stage do not receive a negative pulse and the stage remains on the "Off" state.

When the associated stage is in the "On" state the right hand triode is not conducting so that its anode and the terminal Y are at a relatively positive potential which because of the selected values of the circuit elements is more positive than the potential of the terminal $t1$ during the occurrence of a negative input pulse. When the terminal Y is more positive than the terminal $t1$, there is a current flow through the rectifying element N' which results in a sudden decrease in the current through the resistor $r152$ and a corresponding rapid drop in the potential of the terminal Y to a relatively more negative value. The relatively negative potential change at terminal Y allows a transient current to flow through the capacitor $c6$. The resulting negative potential at the junction of the resistors $r6$ and $r7$ is impressed upon the control electrode $g1$ of the left hand triode of the associated stage to transfer it from the "On" to the "Off" state and upon the control electrode of the right hand triode of the succeeding stage to transfer the stage from the "Off" to the "On" state.

I claim:

1. A counting system comprising a series of similar stages each of which includes a trigger circuit having two alternate states of stability, the trigger circuit of at least one stage being in a first state of stability and the trigger circuits of the remaining stages being in the alternative state of stability, each stage also including a switching circuit for applying a pulse to the associated trigger circuit to transfer the trigger circuit from the first state to the alternate state of stability, means for simultaneously applying an input pulse to all of the switching circuits, each switching circuit being interconnected with its associated trigger circuit so that it passes the input pulse only when the trigger circuit is in the first state of stability, and means connecting the switching circuit of each stage with the trigger circuit of the succeeding stage so that whenever the trigger circuit of one stage is transferred from the first to the alternate state of stability, a pulse is impressed upon the succeeding stage which transfers the trigger circuit of the succeeding stage from the alternate state of stability to the first state of stability.

2. A counting system comprising a series of similar stages each of which includes a trigger circuit having two electron tubes which alternatively are conductive in the two states of stability of the circuit, the trigger circuit of at least one stage being in a first state of stability and the trigger circuits of the remaining stages being in the alternative state of stability, each stage also including a switching circuit connecting with the control electrode of one of the tubes of the associated trigger circuit for impressing a negative pulse upon the control electrode thereby to transfer the trigger circuit from the first state wherein the tube conducts to the alternate state of stability, each switching circuit also being interconnected with the anode of one of the tubes and including means under control of said last anode for impressing the negative pulse upon the control electrode only when the trigger circuit is in the first state of stability, means for simultaneously applying a negative input pulse to all of the switching circuits thereby to transfer any trigger circuit having the first state of stability to the alternate state of stability, and an interconnection between the anode of the second tube of each trigger circuit of each stage and the control electrode of the second tube of the trigger circuit of the succeeding stage, said interconnection being operable to impress a pulse upon the succeeding stage in response to transfer of the trigger circuit of one stage from the first to the alternate state of stability, each stage including means for transferring its trigger circuit from the alternate state of stability to the first state of stability in response to said last pulse from a preceding stage.

3. A counting system comprising a series of similar stages each of which includes a trigger circuit having two electron tubes which alternatively are conductive in the two states of stability of the circuit, the trigger circuit of at least one stage being in a first state of stability and the trigger circuits of the remaining stages being in the alternative state of stability, each stage also including a switching circuit connecting with the control electrode of one of the tubes of the associated trigger circuit for impressing a negative pulse upon the control electrode thereby to transfer the trigger circuit from the first state wherein the tube conducts to the alternate state of stability, each switching circuit also being interconnected with the anode of one of the tubes and arranged so that the negative pulse is impressed upon the control electrode only if the trigger circuit is in the first state of stability, means for simultaneously applying a negative input pulse to all of the switching circuits thereby to transfer any trigger circuit having the first state of stability to the alternate state of stability, and an interconnection of the output of each switching circuit of each stage with the control electrode of the second tube of the trigger circuit of the succeeding stage so that whenever the trigger circuit of one stage is transferred from the first to the alternate state of stability, a pulse is impressed upon the succeeding stage which transfers the trigger circuit of the succeeding stage from the alternate state of stability to the first state of stability.

4. A counting system comprising a series of similar stages each of which includes a trigger circuit having two electron tubes which alternatively are conductive in the two states of stability of the circuit, the trigger circuit of at least one stage being in a first state of stability and the trigger circuits of the remaining stages being in the alternative state of stability, each stage also including a switching circuit having two input channels and an output channel connected with the control electrode of the tube of the associated trigger circuit which is conducting in the first state of stability, the switching circuit including means for impressing a negative pulse upon the control electrode only when negative potentials are applied simultaneously to its input channels, one input channel being connected to the anode of the same tube so that a relatively negative potential is applied to such channel when the tube is conducting with the associated trigger circuit in the first state of stability, means for simultaneously applying a negative input pulse to all of the switching circuits to impress a negative pulse upon the control electrode of the conducting tube of the trigger circuit in the first state of stability thereby to transfer any trigger circuit having the first state of stability to the alternate state of stability, and an interconnection between the anode of the second tube of each trigger circuit of each stage and the control electrode of the second tube of the trigger circuit of the succeeding stage, said interconnection being operable to impress a pulse upon the succeeding stage in response to the transfer of the trigger circuit of one stage from the first to the alternate state of stability, each stage including means for transferring its trigger circuit from the alternate state of stability to the first state of stability in response to said last pulse from a preceding stage.

5. A counting system comprising a series of similar stages each of which includes a trigger circuit having two electron tubes which alternatively are conductive in the two states of stability of the circuit, the trigger circuit of at least one stage being in a first state of stability and the trigger circuits of the remaining stages being in the alternative state of stability, each stage also including a switching circuit having two input channels and an output channel connected with the control electrode of the tube of the associated trigger circuit which is conducting in the first state of stability, the switching circuit being effective to impress a negative pulse upon the control electrode only when negative potentials are applied simultaneously to its input channels, one input channel being connected to the anode of the same tube so that a relatively negative potential is applied to such channel when the tube is conducting with the associated trigger circuit in the first state of stability, means for simultaneously applying a negative input pulse to all of the switching circuits to impress a negative pulse upon the control electrode of the conducting tube of the trigger circuit in the first state of stability thereby to transfer any trigger circuit having the first state of stability to the alternate state of stability, and an interconnection between the output channel of the switching circuit of each stage and the control electrode of the second tube of the trigger circuit of the succeeding stage so that whenever the trigger circuit of one stage is transferred from the first to the alternate state of stability, a pulse is impressed upon the succeeding stage which transfers the trigger circuit of the succeeding stage from the alternate state of stability to the first state of stability.

6. A counting system comprising a series of similar stages each of which includes a trigger circuit having two electron tubes which alternatively are conductive in the two states of stability of the circuit, the trigger circuit of at least one stage being in a first state of stability and the trigger circuits of the remaining stages being in the alternative state of stability, each stage also including a switching circuit having a resistor one end of which is held at a substantially fixed negative potential, the other end of the resistor being connected with a pair of unidirectional current carrying elements disposed to that the negative potential will cause a current to flow through the resistor and either element, the common junction of the resistor and elements also being coupled with the control electrode of the tube which is conducting in the first state of stability, one of the elements also being connected with the anode of the same tube so that a relatively negative potential is impressed upon the element when the tube is conducting, means for simultaneously applying a negative input pulse to all of the other unidirectional current carrying elements of the switching circuits to impress a negative pulse upon the control electrode of the conducting tube of the trigger circuit in the first state of stability thereby to transfer any trigger circuit having the first state of stability to the alternate state of stability, and means connecting each stage with the control electrode of the tube of the succeeding stage which is non-conducting in the first state of stability of the associated trigger circuit so that whenever the trigger circuit of one stage is transferred from the first to the alternate state of stability, a pulse is impressed upon the succeeding stage which transfers the trigger circuit of the succeeding stage from the alternate state of stability to the first state of stability.

7. A counting system comprising a series of similar stages each of which includes a trigger circuit having two electron tubes which alternatively are conductive in the two states of stability of the circuit, the trigger circuit of at least one stage being in a first state of stability and the trigger circuits of the remaining stages being in the alternative state of stability, each stage also including a switching circuit having a resistor one end of which is held at a substantially fixed negative potential, the other end of the resistor being connected with a pair of unidirectional current carrying elements disposed so that the negative potential will cause a current to flow through the resistor and either element, the common junction of the resistor and either element, the common junction of the resistor and elements also being coupled with the control electrode of the tube which is conducting in the first state of stability, one of the elements also being connected with the anode of the same tube so that a relatively negative potential is impressed upon the element when the tube is conducting, means for simultaneously applying a negative input pulse to all of the other unidirectional current carrying elements of the switching circuits to impress a negative pulse upon the control electrode of the conducting tube of the trigger circuit in the first state of stability thereby to transfer any trigger circuit having the first state of stability to the alternate state of stability, and an interconnection between the anode of the tube which is non-conducting in the first state of stability of each trigger circuit of each stage and the control electrode of the tube of the succeeding stage which is non-conducting in the first state of stability of the associated trigger circuit so that whenever the trigger circuit of one stage is transferred from the first to the alternate state of stability, a pulse is impressed upon the succeeding stage which transfers the trigger circuit of the succeeding stage from the alternate state of stability to the first state of stability.

8. A counting system comprising a series of similar stages each of which includes a trigger circuit having two electron tubes which alternatively are conductive in the two states of stability of the circuit, the trigger circuit of at least one stage being in a first state of stability and the trigger circuits of the remaining stages being in the alternative state of stability, each stage also including a switching circuit having a resistor one end of which is held at a substantially fixed negative potential, the other end of the resistor being connected with a pair of unidirectional current carrying elements disposed so that the negative potential will cause a current to flow through the resistor and either element, the common junction of the resistor and elements also being coupled with the control electrode of the tube which is conducting in the first state of stability, one of the elements also being connected with the anode of the same tube so that a relatively negative potential is impressed upon the element when the tube is conducting, means for simultaneously applying a negative input pulse to all of the other unidirectional current carrying elements of the switching circuits to impress a negative pulse upon the control electrode of the conducting tube of the trigger circuit in the first state of stability thereby to transfer any trigger circuit having the first state of stability to the alternate state of stability, and an interconnection between the common junction of the resistor and the unidirectional current carrying elements of each stage and the control electrode of the tube of the succeeding stage which is nonconducting in the first stage of stability of the associated trigger circuit so that whenever the trigger circuit of one stage is transferred from the first to the alternate state of stability, a pulse is impressed upon the succeeding stage which transfers the trigger circuit of the succeeding stage from the alternate state of stability to the first state of stability.

9. A counting system comprising a series of similar stages each of which includes a trigger circuit having two electron tubes which alternatively are conductive in the two states of stability of the circuit, the trigger circuit of at least one stage being in a first state of stability and the trigger circuits of the remaining stages being in the alternative state of stability, each stage also including a switching circuit having a resistor one end of which is held at a substantially fixed negative potential, the other end of the resistor being connected with a unidirectional current carrying element disposed so that the negative potential will cause a current to flow through the resistor and the element, the common junction of the element and the resistor being connected to both the anode and control electrode of the tube which is conducting in the first state of stability, means for simultaneously applying a negative input pulse to all of the unidirectional current carrying elements of the switching circuits to impress a negative pulse upon the control electrode of the conducting tube of the trigger circuit in the first state of stability thereby to transfer any trigger circuit having the first state of stability to the alternate state of stability, and means connecting each stage with the control electrode of the tube of the succeeding stage which is non-conducting in the first state of stability of the associated trigger circuit so that whenever the trigger circuit of one stage is transferred from the first to the alternate state of stability, a pulse is impressed upon the succeeding stage which transfers the trigger circuit of the succeeding stage from the alternate state of stability to the first state of stability.

10. A counting system comprising a series of similar stages each of which includes a trigger circuit having two electron tubes which alternatively are conductive in the two states of stability of the circuit, the trigger circuit of at least one stage being in a first state of stability and the trigger circuits of the remaining stages being in the alternative state of stability, each stage also including a switching circuit having a resistor one end of which is held at a substantially fixed negative potential, the other end of the resistor being connected with a unidirectional current carrying element disposed so that the negative potential will cause a current to flow through the resistor and the element, the common junction of the element and resistor being connected to both the anode and control electrode of the tube which is conducting in the first state of stability, means for simultaneously applying a negative input pulse to all of the unidirectional current carrying elements of the switching circuits to impress a negative pulse only upon the control electrode of the conducting tube of the trigger circuit in the first state of stability thereby to transfer any trigger circuit having the first state of stability to the alternate state of stability, and an interconnection between the anode of the tube of each trigger circuit which is non-conducting in the first state of stability and the control electrode of the corresponding tube of the trigger circuit of the succeeding stage so that whenever the trigger circuit of one stage is transferred from the first to the alternate state of stability, a pulse is impressed upon the succeeding stage which transfers the trigger circuit of the succeeding stage from the alternate state of stability to the first state of stability.

11. A counting system comprising a series of similar stages each of which includes a trigger circuit having two electron tubes which alternatively are conductive in the two states of stability of the circuit, the trigger circuit of at least one stage being in a first state of stability and the trigger circuits of the remaining stages being in the alternative state of stability, each stage also including a switching circuit having a resistor one end of which is held at a substantially fixed negative potential, the other end of the resistor being connected with a unidirectional current carrying element disposed so that the negative potential will cause a current to flow through the resistor and the element, the common junction of the element and resistor being connected to both the anode and control electrode of the tube which is conducting in the first state of stability, means for simultaneously applying a negative input pulse to all of the unidirectional current carrying elements of the switching circuits to impress a negative pulse only upon the control electrode of the conducting tube of the trigger circuit in the first state of stability thereby to transfer any trigger circuit having the first state of stability to the alternate state of stability, and an interconnection between the common junction of the resistor and the unidirectional current carrying element of each stage and the control electrode of the tube of the succeeding stage which is conducting in the alternate state of stability of the associated trigger circuit so that whenever the trigger circuit of one stage is transferred from the first to the alternate state of stability, a pulse is impressed upon the succeeding stage which transfers the trigger circuit of the succeeding stage from the alternate state of stability to the first state of stability.

12. A counting system comprising a series of similar stages each of which includes a trigger circuit having two electron tubes which alternatively are conductive in the two states of stability of the circuit, the trigger circuit of at least one stage being in a first state of stability and the trigger circuits of the remaining stages being in the alternative state of stability, each stage also including a switching circuit having two resistors connected in series, the end of the first resistor being held at a substantially fixed negative potential, the end of the second resistor being connected to the anode of the tube which is non-conducting in the first state of stability, a unidirectional current carrying element connected to the common junction of the resistors so as to impress a negative potential thereupon, the common junction also being coupled to the control electrode of the tube which is conducting in the first state of stability, means for simultaneously applying a negative input pulse to all of the unidirectional current carrying elements of the switching circuits to impress a negative pulse upon the control electrode of the conducting tube of the trigger circuit in the first state of stability thereby to transfer any trigger circuit having the first state of stability to the alternate state of stability, and means connecting each stage with the control electrode of the tube which is non-conducting in the first state of stability of the trigger circuit of the succeeding stage so that whenever the trigger circuit of one stage is transferred from the first to the alternate state of stability, a pulse is impressed upon the succeeding stage which transfers the trigger circuit of the succeeding stage from the alternate state of stability to the first state of stability.

13. A counting system comprising a series of similar stages each of which includes a trigger circuit having two electron tubes which alternatively are conductive in the two states of stability of the circuit, the trigger circuit of at least one stage being in a first state of stability and the trigger circuits of the remaining stages being in the alternative state of stability, each stage also including a switching circuit having two resistors connected in series, the end of the first resistor being held at a substantially fixed negative potential, the end of the second resistor being connected to the anode of the tube which is non-conducting in the first state of stability, a unidirectional current carrying element connected to the common junction of the resistors so as to impress a negative potential thereupon, the common junction also being coupled to the control electrode of the tube which is conducting in the first state of stability, means for simultaneously applying a negative input pulse to all of the unidirectional current carrying elements of the switching circuits to impress a negative pulse upon the control electrode of the conducting tube of the trigger circuit in the first state of stability thereby to transfer any trigger circuit having the first state of stability to the alternate state of stability, and an interconnection between the anode of the tube of each trigger circuit which is non-conducting in the first state of stability and with the control electrode of the corresponding tube of the trigger circuit of the succeeding stage so that whenever the trigger circuit of one stage is transferred from the first to the alternate state of stability, a pulse is impressed upon the succeeding stage which transfers the trigger circuit of the succeeding stage from the alternate state of stability to the first state of stability.

14. A counting system comprising a series of similar stages each of which includes a trigger circuit having two electron tubes which alternatively are conductive in the two states of stability of the circuit, the trigger circuit of at least one stage being in a first state of stability and the trigger circuits of the remaining stages being in the alternative state of stability, each stage also including a switching circuit having two resistors connected in series, the end of the first resistor being held at a substantially fixed negative potential, the end of the second resistor being connected to the anode of the tube which is non-conducting in the first state of stability, a unidirectional current carrying element connected to the common junction of the resistors so as to impress a negative potential thereupon, the common junction also being coupled to the control electrode of the tube which is conducting in the first state of stability, means for simultaneously applying a negative input pulse to all of the unidirectional current carrying elements of the switching circuits to impress a negative pulse upon the control electrode of the conducting tube of the trigger circuit in the first state of stability thereby to transfer any trigger circuit having the first state of stability to the alternate state of stability, and an interconnection between the common junction of the resistor and the unidirectional current carrying element of each stage and the control electrode of the tube of the succeeding stage which is conducting in the alternate state of stability of the associated trigger circuit so that whenever the trigger circuit of one stage is transferred from the first to the alternate state of stability, a pulse is impressed upon the succeeding stage which transfers the trigger circuit of the succeeding stage from the alternate state of stability to the first state of stability.

15. A counting system comprising a series of similar stages each of which includes a trigger circuit including two electron tubes each having a cathode connected directly to ground, two load resistors each of which connects the anode of a respective tube to a common positive potential source, two voltage divider networks each of which extends between a respective anode and ground, the control electrode of each tube being coupled respectively to an intermediate point on the voltage divider network connecting with the anode of the other tube, and a capacitor connected respectively between the control electrode of each tube and the anode of the other tube whereby the tubes are alternatively conductive in the two states of stability of the trigger circuit, either state of stability being transferable to the other by the application of a negative potential to the conducting tube, the trigger circuit of at least one stage being in a first state of stability and the trigger circuits of the remaining stages being in the alternative state of stability, each stage also including a switching circuit connecting with the control electrode of one of the tubes of the associated trigger circuit for impressing a negative pulse upon the control electrode thereby to transfer the trigger circuit from the first state wherein the tube conducts to the alternate state of stability, each switching circuit also being interconnected with the anode of one of the tubes and including means under control of said last anode for impressing the negative pulse upon the control electrode only if the trigger circuit is in the first state of stability, means for simultaneously applying a negative input pulse to all of the switching circuits thereby to transfer any trigger circuit having the first state of stability to the alternate state of stability, and means connecting each stage with the control electrode of the tube of the trigger circuit of the succeeding stage which is conducting in the alternate state of stability, said connecting means being operable to impress a pulse upon the succeeding stage in response to the transfer of the trigger circuit of one stage from the first to the alternate state of stability, each stage including means for transferring its trigger circuit from the alternate state of stability to the first state of stability in response to said last pulse from a preceding stage.

16. A counting system comprising a series of similar stages each of which includes a trigger circuit having two alternate states of stability, the trigger circuit of at least one stage being in a first state of stability and the trigger circuits of the remaining stages being in the alternative state of stability, each stage also including a switching circuit for applying a pulse to the associated trigger circuit to transfer the trigger circuit from the first state to the alternate state of stability, means for simultaneously applying an input pulse to all of the switching circuits, each switching circuit having an interconnection with its associated trigger circuit and including means operable from said interconnection to pass the input pulse only when the trigger circuit is in the first state of stability, and means connecting each stage with the succeeding stage to apply a pulse to the trigger circuit of the succeeding stage causing the trigger circuit of said succeeding stage to transfer from the alternate stage of stability to the first state of stability, each stage including means for transferring its trigger circuit from the alternate state of stability to the first state of stability in response to said last pulse from a preceding stage.

17. A counting system comprising a series of similar stages each of which includes a trigger circuit having two alternate states of stability, the trigger circuit of at least one stage being in a first state of stability and the trigger circuits of the remaining stages being in the alternative state of stability, each stage also including a switching circuit for applying a pulse to the associated trigger circuit to transfer the trigger circuit from the first state to the alternate state of stability, means for simultaneously applying an input pulse to all of the switching circuits, each switching circuit having an interconnection with its associated trigger circuit and including means operable from said interconnection to pass the input pulse only when the trigger circuit is in the first state of stability, and a connection from the trigger circuit of each stage to the trigger circuit of the succeednig stage including means responsive to the transfer of the trigger circuit of one stage from the first to the alternate state of stability for impressing a pulse upon the succeeding stage, each stage including means for transferring its trigger circuit from the alternate state of stability to the first state of stability in response to said last pulse from a preceding stage.

18. A counting system comprising a series of similar stages each of which includes a trigger circuit having two electron tubes which alternatively are conductive in the two states of stability of the circuit, the trigger circuit of at least one stage being in a first state of stability and the trigger circuits of the remaining stages being in the alternative state of stability, each stage also including a switching circuit connected with the control electrode of one of the tubes of the associated trigger circuit for impressing a negative pulse upon the control electrode thereby to transfer the trigger circuit from the first state wherein the tube conducts to the alternate state of stability, each switching circuit also having an interconnection with the anode of one of the tubes and including means operable from said interconnection to impress the negative pulse upon the control electrode only when the trigger circuit is in the first state of stability, means for simultaneously applying a negative input pulse to all of the switching circuits thereby to transfer any trigger circuit having the first state of stability to the alternate state of stability, and a connection from each stage to the control electrode of the second tube of the trigger circuit of the succeeding stage, said connection being operable to impress a pulse upon the succeeding stage causing the trigger circuit of said succeeding stage to transfer from the alternate state of stability to the first state of stability, each stage including means for transferring its trigger circuit from the alternate state of stability to the first state of stability in response to said last pulse from a preceding stage.

19. A counting system comprising a series of similar stages each of which includes a trigger circuit having two electron tubes which alternatively are conductive in the two states of stability of the circuit, the trigger circuit of at least one stage being in a first state of stability and the trigger circuits of the remaining stages being in the alternative state of stability, each stage also including a switching circuit having two input channels and an output channel connected with the control electrode of the tube of the associated trigger circuit which is conducting in the first state of stability, the switching circuit including means for impressing a negative pulse upon the control electrode only when negative potentials are applied simultaneously to its input channels, one input channel being connected to the anode of the same tube so that a relatively negative potential is applied to such channel when the tube is conducting with the associated trigger circuit in the first state of stability, means for simultaneously applying a negative input pulse to all of the switching circuits to impress a negative pulse upon the control electrode of the conducting tube of the trigger circuit in the first state of stability thereby to transfer any trigger circuit having the first state of stability to the alternate state of stability, and a connection from each stage to the control electrode of the second tube of the trigger circuit of the succeeding stage, said connection being operable to impress a pulse upon the succeeding stage causing the trigger circuit of said succeeding stage to transfer from the alternate state of stability to the first state of stability, each stage including means for transferring its trigger circuit from the alternate state of stability to the first state of stability in response to said last pulse from a preceding stage.

20. A ring circuit comprising a plurality of bistable circuits each having a first input pulse responsive means for causing the bistable circuit to assume a first predetermined state in response to a pulse and a second input pulse responsive means for causing the bistable circuit to assume a stable state opposite to said predetermined state in response to a pulse, a plurality of coincidence circuits each having a first output connected to said first pulse responsive input means of one of said bistable circuits and a second output connected to said second pulse responsive input means of another of said bistable circuits, a pulse source applied to one input of each of said coincidence circuits, and means responsive to the stable conditions of said bistable circuits for conditioning said coincidence circuits.

References Cited in the file of this patent

UNITED STATES PATENTS

| | | |
|---|---|---|
| 2,557,186 | Hamacher | June 19, 1951 |
| 2,591,961 | Moore et al. | Apr. 8, 1952 |
| 2,594,731 | Connolly | Apr. 29, 1952 |
| 2,644,887 | Wolfe | July 7, 1953 |
| 2,719,228 | Auerbach et al. | Sept. 27, 1955 |
| 2,764,343 | Diener | Sept. 25, 1956 |
| 2,771,551 | Hampton | Nov. 20, 1956 |